United States Patent
Gilstrap

(10) Patent No.: US 10,177,509 B1
(45) Date of Patent: Jan. 8, 2019

(54) ELECTRICAL RECEPTACLE MOUNTING PREVENTIVE OF WATER INGRESS

(71) Applicant: Mark Gilstrap, Monroe, WA (US)

(72) Inventor: Mark Gilstrap, Monroe, WA (US)

( * ) Notice: Subject to any disclaimer, the term of this patent is extended or adjusted under 35 U.S.C. 154(b) by 0 days.

(21) Appl. No.: 15/900,113

(22) Filed: Feb. 20, 2018

Related U.S. Application Data

(60) Provisional application No. 62/630,379, filed on Feb. 14, 2018.

(51) Int. Cl.
| | |
|---|---|
| *H02G 3/10* | (2006.01) |
| *H01R 13/73* | (2006.01) |
| *H02G 3/08* | (2006.01) |
| *F21V 31/00* | (2006.01) |
| *F21V 27/02* | (2006.01) |
| *F21W 131/107* | (2006.01) |
| *E04B 1/62* | (2006.01) |
| *E04B 2/70* | (2006.01) |

(52) U.S. Cl.
CPC .............. *H01R 13/73* (2013.01); *F21V 27/02* (2013.01); *F21V 31/005* (2013.01); *H02G 3/083* (2013.01); *H02G 3/088* (2013.01); *H02G 3/10* (2013.01); *E04B 1/625* (2013.01); *E04B 2/70* (2013.01); *F21W 2131/107* (2013.01)

(58) Field of Classification Search
CPC .......... H01R 13/73; H02G 3/10; H02G 3/088; H02G 3/083; F21V 27/02; F21V 31/005; E04B 2/70; E04B 1/625; F21W 2131/107
USPC ......... 52/60, 61, 302.6, 220.8, 220.1, 126.2, 52/126.4; 174/50, 54, 53, 58, 66, 57, 174/481; 220/4.02
See application file for complete search history.

(56) References Cited

U.S. PATENT DOCUMENTS

| | | | |
|---|---|---|---|
| 2,378,861 A | 6/1945 | Peevey | |
| 4,134,636 A | 1/1979 | Kleinatland | |
| 4,634,015 A * | 1/1987 | Taylor | H02G 3/121 220/3.7 |
| 5,042,673 A | 8/1991 | McShane | |
| 5,287,665 A * | 2/1994 | Rath, Jr. | H02G 3/126 220/3.3 |
| 5,959,249 A | 9/1999 | Hotta | |
| 6,166,327 A | 12/2000 | Saito et al. | |
| 6,506,061 B2 | 1/2003 | Yuasa et al. | |
| 6,547,589 B2 * | 4/2003 | Magyar | H02G 3/121 439/535 |

(Continued)

*Primary Examiner* — Brent W Herring
(74) *Attorney, Agent, or Firm* — Timothy E. Siegel Patent Law, PLLC; Timothy E. Siegel

(57) ABSTRACT

An electrical receptacle mounting apparatus, having a base portion, made of insulating material, and including a partial enclosure, defining a cavity having a mouth and a through-hole, and being positioned and shaped to prevent water flowing through the through-hole out of the cavity. Also, a panel, extends outwardly for more than 4 cm about the mouth and a telescoping tubular extension, made of insulating material, is fitted into the cavity, so that cavity and extension together are sized to fit a one, two or three electrical receptacles. Additionally, a bolt has a longitudinal segment that is rotatably engaged to a first one of the base portion and the extension, and has a threaded portion being in threaded engagement to a second one of the base portion and the extension, so that rotation of the threaded element causes the extension to move in telescoping manner relative to the cavity.

12 Claims, 10 Drawing Sheets

(56) References Cited

U.S. PATENT DOCUMENTS

| | | | |
|---|---|---|---|
| 6,596,938 B2 | 7/2003 | Gilleran | |
| 6,629,619 B2 * | 10/2003 | Sato | H02G 3/088 220/3.8 |
| 6,649,835 B2 * | 11/2003 | Gilleran | H02G 3/088 174/50 |
| 6,737,576 B1 | 5/2004 | Dinh | |
| 6,866,032 B2 * | 3/2005 | Magyar | H02G 3/121 125/13.01 |
| 6,881,094 B2 * | 4/2005 | Magyar | H02G 3/121 439/535 |
| 6,908,003 B2 * | 6/2005 | Feyes | H02G 3/088 174/53 |
| 6,951,081 B2 | 10/2005 | Bonshor | |
| 6,982,379 B2 | 1/2006 | Saka et al. | |
| 7,312,395 B1 * | 12/2007 | Gretz | H02G 3/123 174/53 |
| 7,645,937 B2 | 1/2010 | Bhosale | |
| 7,812,253 B2 * | 10/2010 | Moselle | H02G 3/088 174/480 |
| 8,013,242 B1 * | 9/2011 | Thibault | H02G 3/185 174/481 |
| 8,058,570 B2 * | 11/2011 | Solan | H02G 3/14 174/50 |
| 8,076,578 B1 * | 12/2011 | Gretz | H02G 3/126 174/50 |
| 8,371,465 B2 * | 2/2013 | Denier | H02G 3/086 206/722 |
| 8,610,004 B2 * | 12/2013 | Solan | H02G 3/123 174/50 |
| 8,633,384 B1 * | 1/2014 | Shotey | H02G 3/126 174/50 |
| 8,987,593 B2 * | 3/2015 | Korcz | H02G 3/123 174/58 |
| 9,048,645 B1 | 6/2015 | Gretz | |
| 9,059,577 B2 * | 6/2015 | Solan | H02G 3/123 |
| 9,653,860 B2 * | 5/2017 | Hestrin | H01R 13/73 |
| 9,893,503 B2 * | 2/2018 | Geno | H02G 3/086 |
| 9,935,436 B1 * | 4/2018 | Baldwin | H02G 3/083 |
| 9,954,348 B2 * | 4/2018 | Rose | H02G 3/088 |
| 2002/0031942 A1 * | 3/2002 | Magyar | H02G 3/121 439/535 |
| 2002/0125031 A1 * | 9/2002 | Gilleran | H02G 3/088 174/58 |
| 2003/0116341 A1 * | 6/2003 | Gilleran | H02G 3/088 174/58 |
| 2003/0165364 A1 * | 9/2003 | Magyar | H02G 3/121 408/1 R |
| 2003/0190838 A1 * | 10/2003 | Magyar | H02G 3/121 439/535 |
| 2005/0051546 A1 * | 3/2005 | Dinh | H02G 3/126 220/3.7 |
| 2007/0175649 A1 * | 8/2007 | Moselle | A62C 2/065 174/50 |
| 2011/0253565 A1 * | 10/2011 | Moselle | A62C 2/065 206/223 |
| 2012/0186871 A1 * | 7/2012 | Roberts | H02G 3/086 174/520 |
| 2016/0141852 A1 * | 5/2016 | Gagne | H02G 3/14 174/54 |
| 2016/0226232 A1 * | 8/2016 | Gagne | H02G 3/086 |
| 2016/0329668 A1 * | 11/2016 | Hestrin | H01R 13/73 |
| 2016/0329669 A1 * | 11/2016 | Hestrin | H01R 13/73 |

* cited by examiner

ELECTRICAL RECEPTACLE MOUNTING PREVENTIVE OF WATER INGRESS

RELATED APPLICATIONS

This application claims benefit of provisional patent application U.S. Ser. No. 62/630,379 filed on Feb. 14, 2018 which is incorporated by referenced as if fully set forth herein.

BACKGROUND

A modern building structure is constructed with an exterior cladding, or primary weather barrier, that provides a first line of defense against the elements and also provides a good appearance for the building structure. Interior to and generally supporting the exterior cladding there is a building frame, typically made of dimensioned lumber (longitudinal elements) mechanically attached together, with sheets of plywood or particle board mechanically attached to the exterior side of these longitudinal elements. The dimensioned lumber may go by industry standard terminology of 2 by 4s, 2 by 6s, 2 by 8s, or even wider elements, depending on the load that must be born, and other factors. Wall board is typically mechanically fastened to the interior side of the longitudinal elements, thereby defining a "wall cavity" between the exterior sheathing and the interior wall board. A secondary weather barrier, that is generally water resistant and is typically made of polymer sheeting, such as Tyvek®, or building paper, is mechanically attached to the building frame. These sheets are generally arranged as shingles are, with each upper piece of sheeting overlapping on the outside of the sheeting immediately below. With this arrangement water does not have any chance of penetrating through to the wall cavity of the building as it flows downward.

A weakness in this scheme is created by electrical receptacles and light fixtures, for example for an exterior electrical junction box, which must go through the exterior cladding and the secondary weather barrier. The general scheme for these (until recently) has been to caulk around them to create a seal against the exterior cladding. This is ineffective, however, as cycles of thermal expansion over the years, and the assault of the elements can weaken the seal, leading to water penetrating into the wall cavity. More recently, a line of products, have been introduced, with a shell defining a cavity and a brim, stretching out from a position to the rear of the front of the shell. These are installed, over the electrical junction boxes, with tape or mechanical attachment. Unfortunately, the portion of the shell extending out from the brim location may not protrude out far enough (or may protrude too far) from the brim to be flush with the edge of the exterior cladding, which differs in thickness from job to job. An installation flush with the exterior surface is desirable for appearance and ease of use of an outlet. Also, water that enters the cavity may work its way between the shell extension and the electrical junction box or to the rear of the electrical junction box and exit through the holes in the electrical junction box that accommodate the electrical wires to the electrical receptacle, thereby entering the wall cavity and potentially causing water damage. Also, it is possible that in places the inner surface of the exterior cladding will rest against the secondary weather barrier and the brim. In this case, water may become trapped and instead of flowing downward sit and cause decay and potential mold growth on the interior of the exterior cladding. Finally, the electrical junction box typically requires a further bracket, or fasteners, for secure attachment to the building frame.

SUMMARY

The following embodiments and aspects thereof are described and illustrated in conjunction with systems, tools and methods which are meant to be exemplary and illustrative, not limiting in scope. In various embodiments, one or more of the embodiments are directed to other improvements.

In a first separate aspect, the present invention may take the form of a method of providing an electrical receptacle, on the exterior of a structure having a frame, supporting a secondary weather barrier, and a primary weather barrier having an exterior surface and wherein a prospective location of the exterior surface is unknown prior to construction of the primary weather barrier. The method utilizes an electrical receptacle mounting apparatus that has a base portion, including a partial enclosure defining a cavity having a mouth, a through-hole, opposed to the mouth, leading to the cavity and a panel, extending outwardly about the mouth. A telescoping tubular extension is fitted into the cavity, and a bolt is provided, having a longitudinal segment that is rotatably engaged to a first one of the base portion and the extension, and having a threaded portion being in threaded engagement to a second one of the base portion and the extension, so that rotation of the threaded element causes the extension to move in telescoping manner relative to the cavity. After the frame has been built, but before the primary weather barrier has been installed, the panel, and thereby the mounting apparatus, is attached to the frame, and the secondary weather barrier is attached onto the frame. An insulated wire is passed through the through-hole defined by the base portion, and the insulated wire is connected to the electrical receptacle so as to supply electricity to the electrical receptacle. Finally, electrical receptacle is attached into the cavity the primary weather barrier is installed, with a through-hole left in it, to accommodate the extension. Finally, the threaded element is rotated to move the extension to a level flush with the exterior surface.

In a second separate aspect, the present invention may take the form of an electrical receptacle mounting apparatus, having a base portion, made of insulating material, and including a partial enclosure, defining a cavity having a mouth and a through-hole, and being positioned and shaped to prevent water flowing through the through-hole out of the cavity. Also, a panel, extends outwardly for more than 4 cm, about the mouth and a telescoping tubular extension, made of insulating material, is fitted into the cavity, so that cavity and extension together are sized to fit a one, two or three electrical receptacles. Additionally, a bolt has a longitudinal segment that is rotatably engaged to a first one of the base portion and the extension, and has a threaded portion being in threaded engagement to a second one of the base portion and the extension, so that rotation of the threaded element causes the extension to move in telescoping manner relative to the cavity.

In a third separate aspect, the present invention may take the form of an exterior wall having an outer surface includes a frame, made of longitudinal structural elements, joined together and a secondary weather barrier, mounted on the frame. Also, a primary weather barrier, is positioned outwardly of the secondary weather barrier, and has an outer surface that is also the outer surface of the exterior wall. An electrical receptacle mounting apparatus, includes a base, and the base includes a partial enclosure that defines a cavity having a mouth, and a through-hole, opposed to the mouth, leading to the cavity, and a panel extending outwardly from the partial enclosure, parallel to the secondary weather barrier. The panel is joined to at least one of the longitudinal structural elements and is disposed so that the base forms a portion of the secondary weather barrier. Finally, the electrical receptacle mounting apparatus further includes a telescoping tubular extension partially set into the cavity and having a front surface, and wherein the extension is set in place so that the front surface is flush with the outer surface of the primary weather barrier. Finally, insulated electrical wires pass through the through-hole, and are connected to the electrical receptacle, and supply electricity to the electrical receptacle, then the electrical receptacle is set into the mounting apparatus.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in the referenced drawings. It is intended that the embodiments and FIG.s disclosed herein are considered illustrative rather than restrictive.

DETAILED DESCRIPTION OF THE PREFERRED EMBODIMENTS

Definition

As used in this application, an "electrical unit" may be either an electrical receptacle (typically having 2, 4, 6 or 8 individual sockets), or an electrical fixture, for example a lighting fixture.

Description

Figure 1:
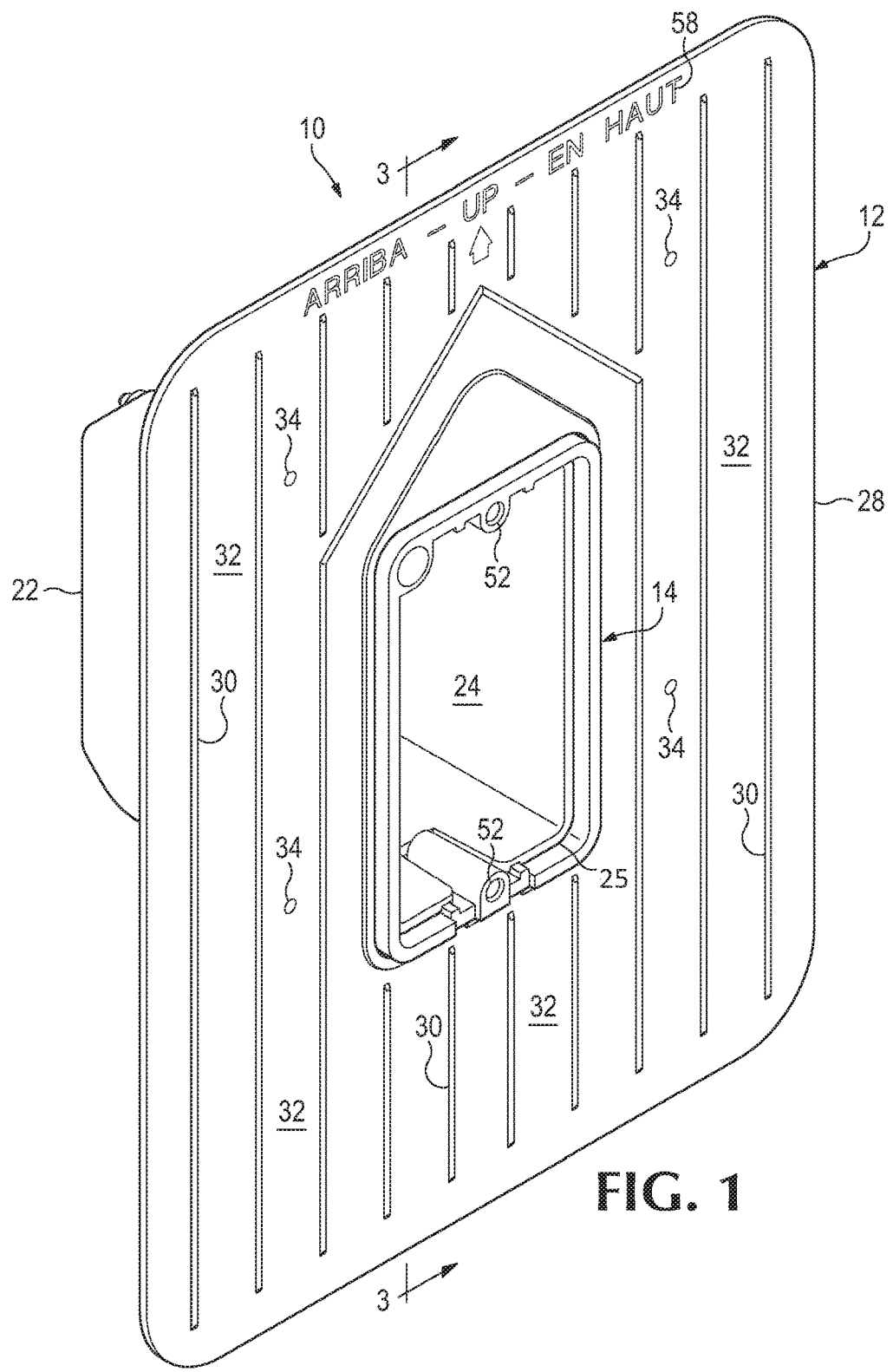
FIG. 1 is an isometric top-front view of an embodiment of an electrical receptacle mounting assembly, according to the present invention.
Figure 2:
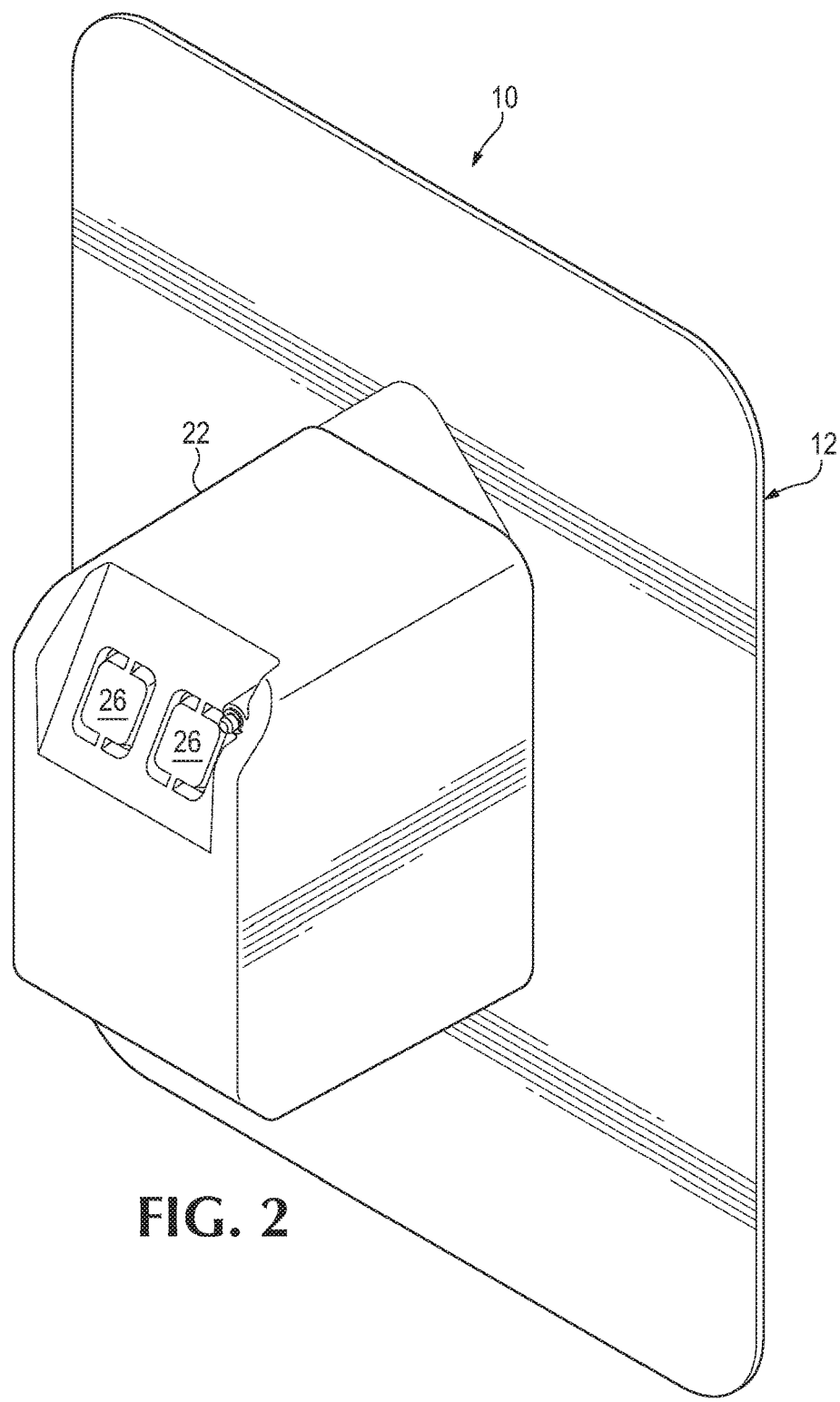
FIG. 2 is an isometric top-rear view of the electrical receptacle mounting assembly of FIG. 1.
Figure 3:
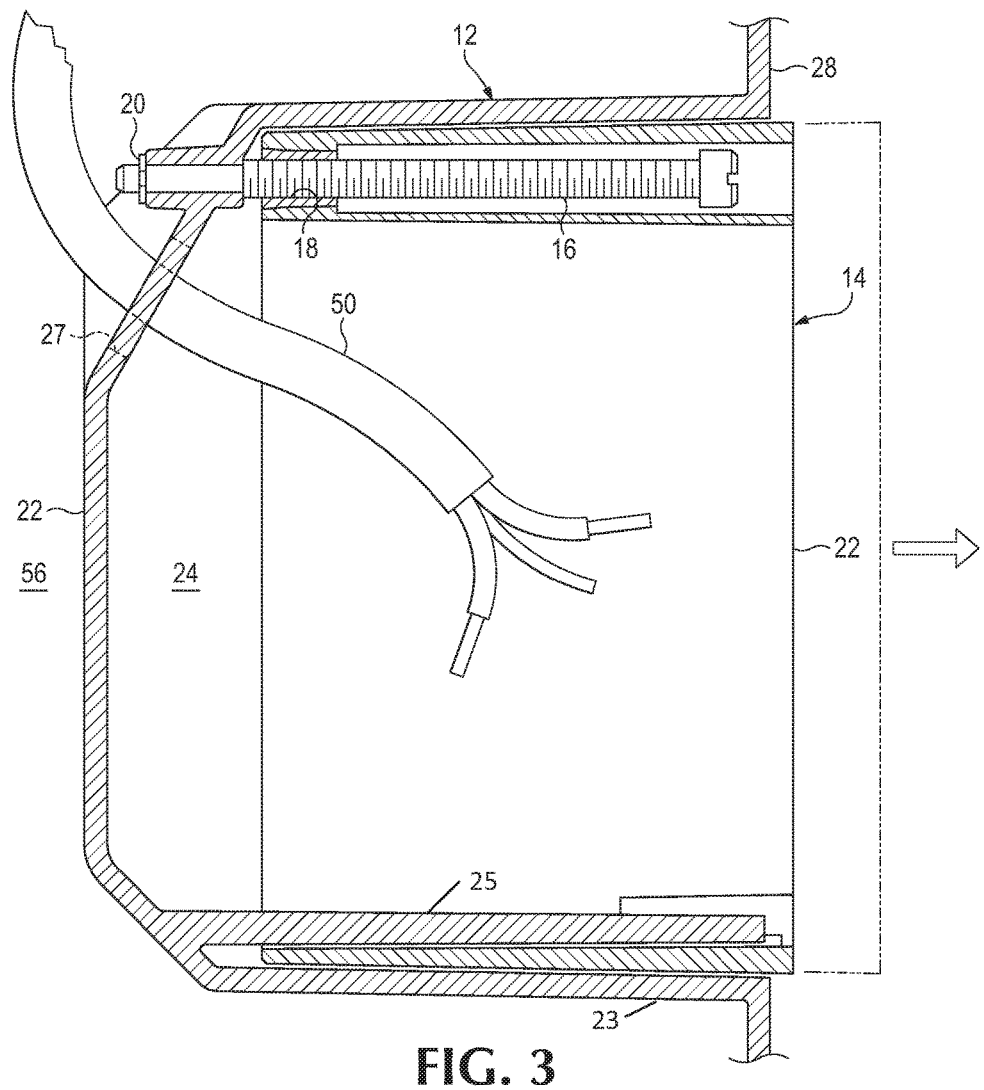
FIG. 3 is an enlarged sectional view of a portion of the electrical receptacle mounting assembly of FIG. 1 along view line 3-3 of FIG. 1 with an alternate position of the front face of telescoping extension 14 shown in dashed line.
Figure 4:
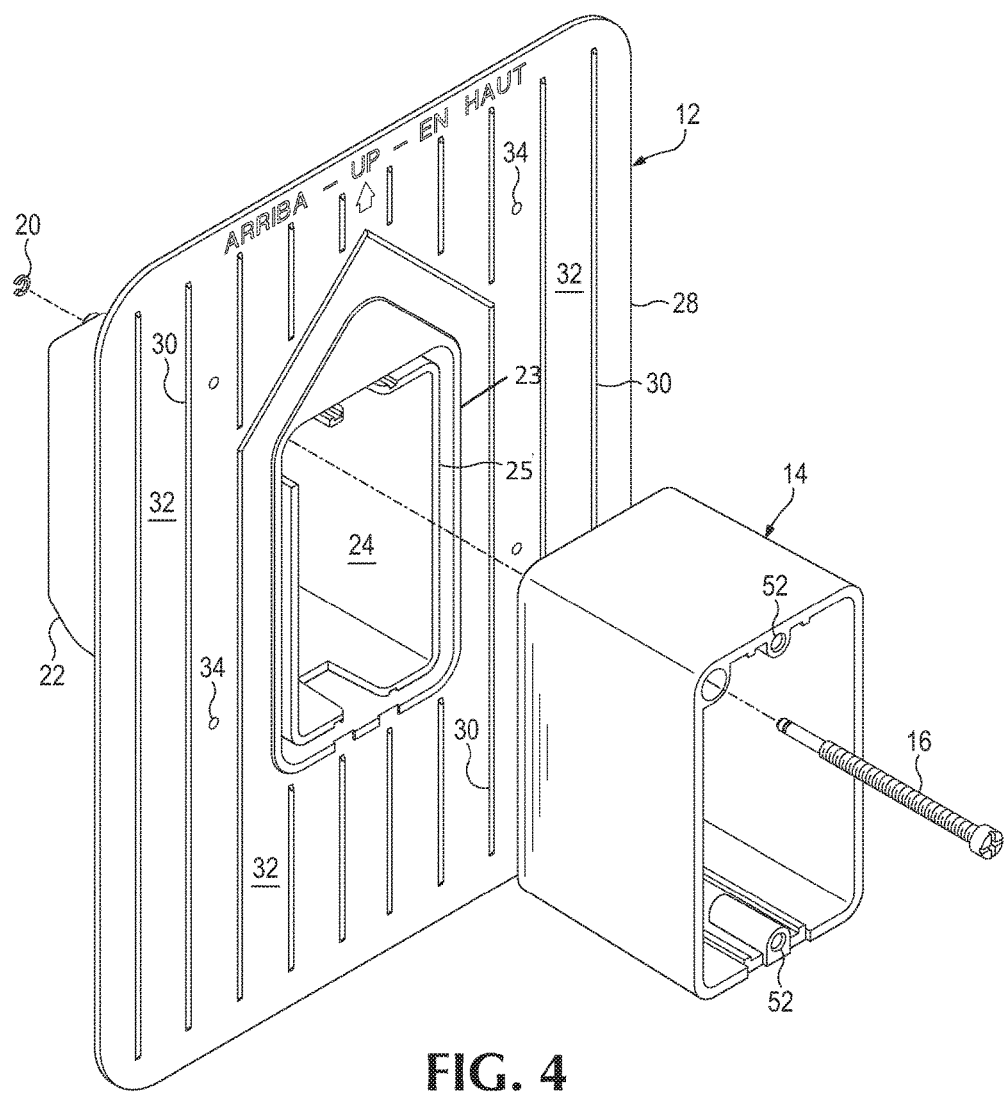
FIG. 4 is an exploded isometric view of the electrical receptacle mounting assembly of FIG. 1.

Referring to FIGS. 1-4, in the attached set of FIGS, an electrical receptacle mounting assembly 10 includes a base unit 12 and a telescoping extension 14. FIGS. 3 and 4 show an adjustment bolt 16 that includes a threaded portion that extends through a threaded opening 18 and is rotatably attached at an anchor 20 at the rear of base unit 12, so that an installer may adjust the distance that extension 14 extends out of base unit by rotating bolt 16, with a manual or an electric screw driver. Skilled persons will recognize that this design can be rearranged so that bolt 16 is in threaded engagement to base unit 12, and rotatably engaged (but fixed in terms of position along the length of bolt 16) to telescoping extension 14, to achieve the same effect.

Base unit 12 consists of two general portions: partial enclosure 22 and panel 28. Partial enclosure 22 defines a base unit cavity 24 that accepts extension 14. Although enclosure 22 has two punch-outs 26 (see FIG. 2) that may be removed to create through-holes 27 (FIG. 3) for permitting an electrician to extend wires into cavity 24 and extension 14, punch-outs 26 are at the top of enclosure 22. Unlike otherwise similar assemblies, there are no through-holes at the bottom. Accordingly, any water that enters cavity 24 must exit through the front.

Skilled persons will readily recognize that partial enclosure 22 includes outer walls 23 (FIGS. 3 and 4) and an interior frame 25 (FIGS. 1, 3 and 4), between which the structure of extension 14 largely fits.

Panel 28 has a set of protruding ribs 30, that prevent any portion of the primary weather barrier 54 (FIG. 8) from blocking water flow through a set of channels 32, defined by ribs 30. A set of guide dimples 34 provide spaced apart places for nailing or screwing base unit 12 to the framing of the structure.

Figure 5:
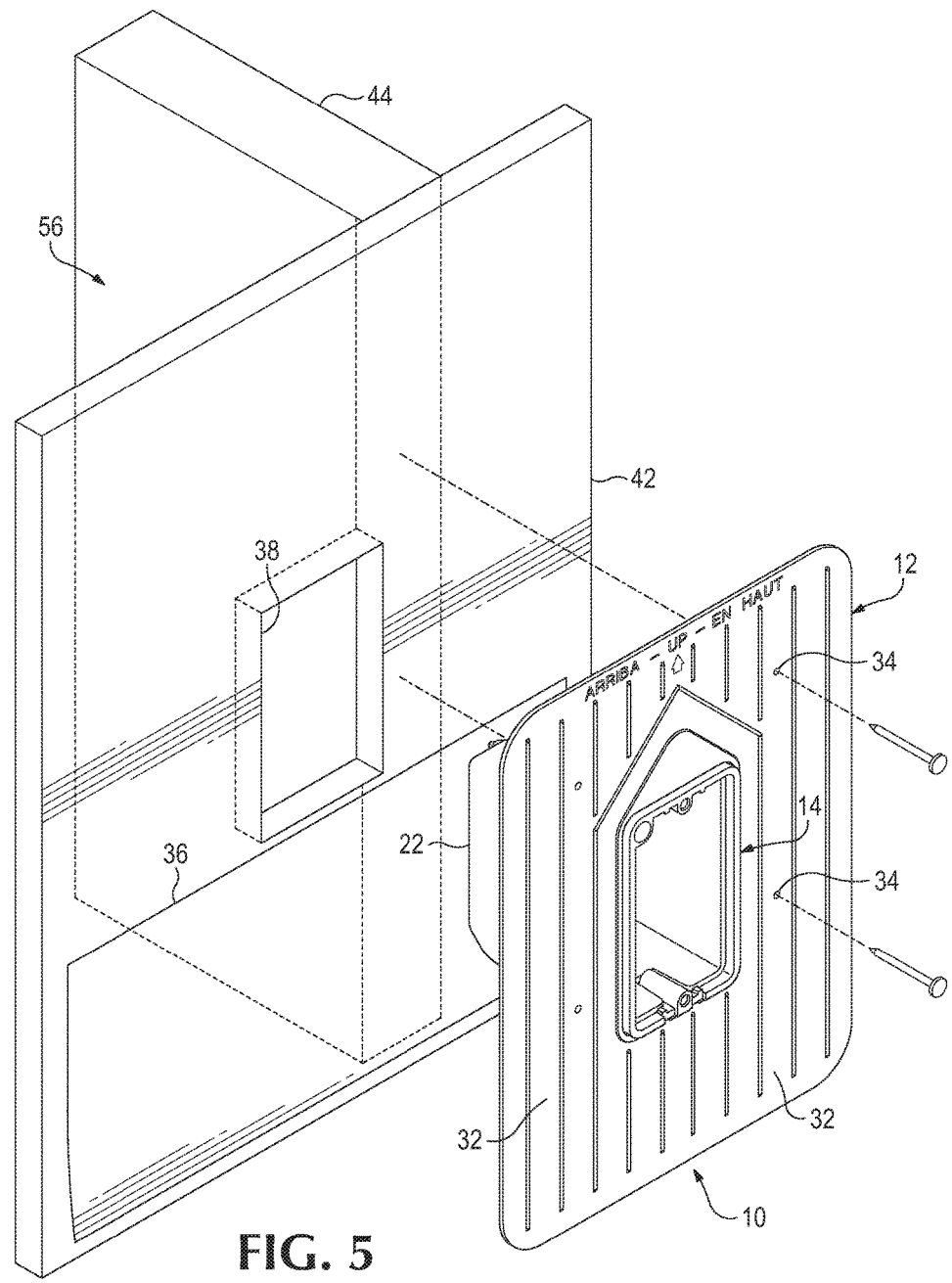
FIG. 5 is an exploded isometric view of the electrical receptacle mounting assembly of FIG. 1, shown during a step in the installation of the assembly into a wall frame, with obscured portions of a longitudinal support in dashed lines.
Figure 6:
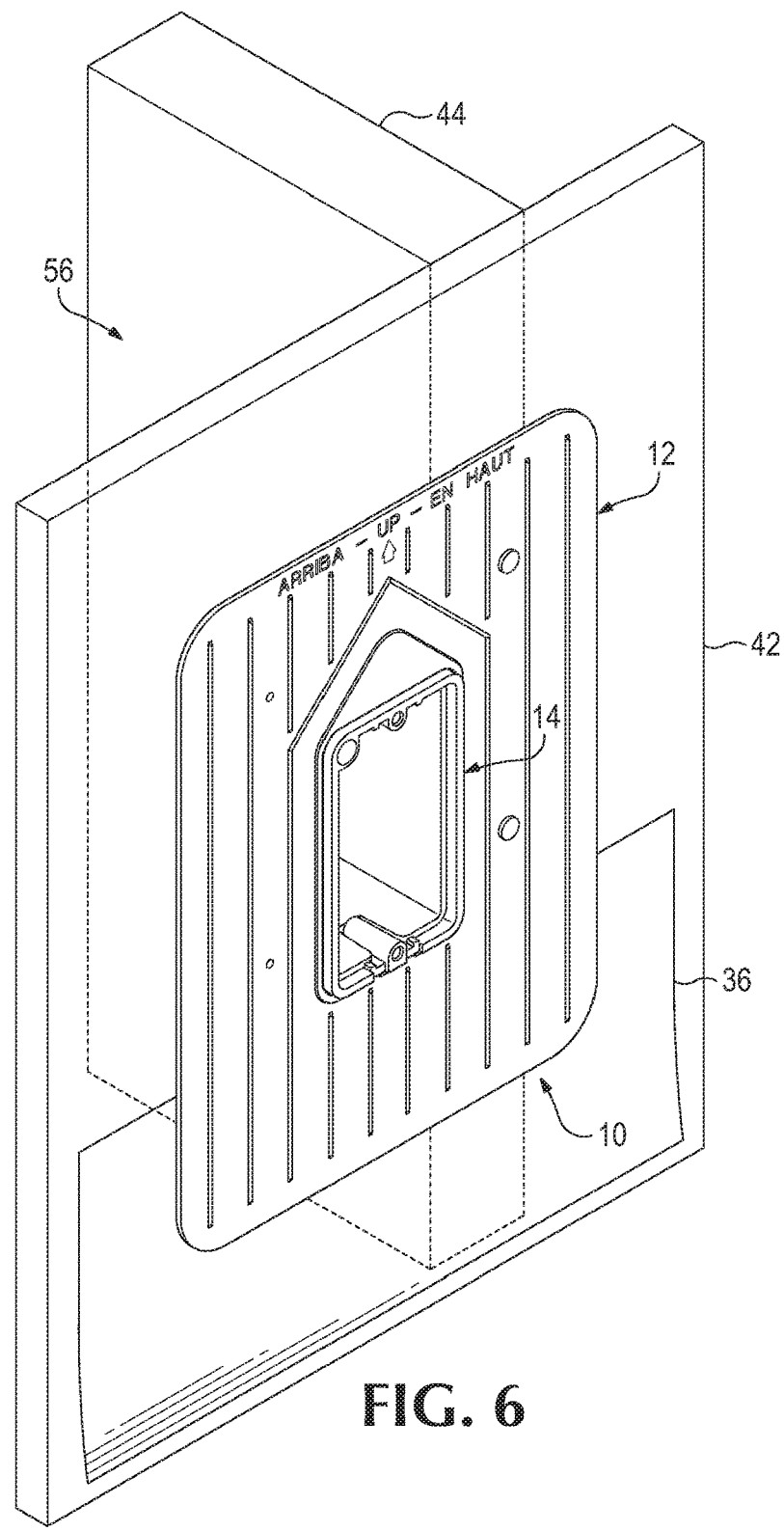
FIG. 6 is an isometric view of the electrical receptacle mounting assembly of FIG. 1, shown during a step in the installation of the assembly into a wall frame, with obscured portions of a framing longitudinal support in dashed lines.
Figure 7:
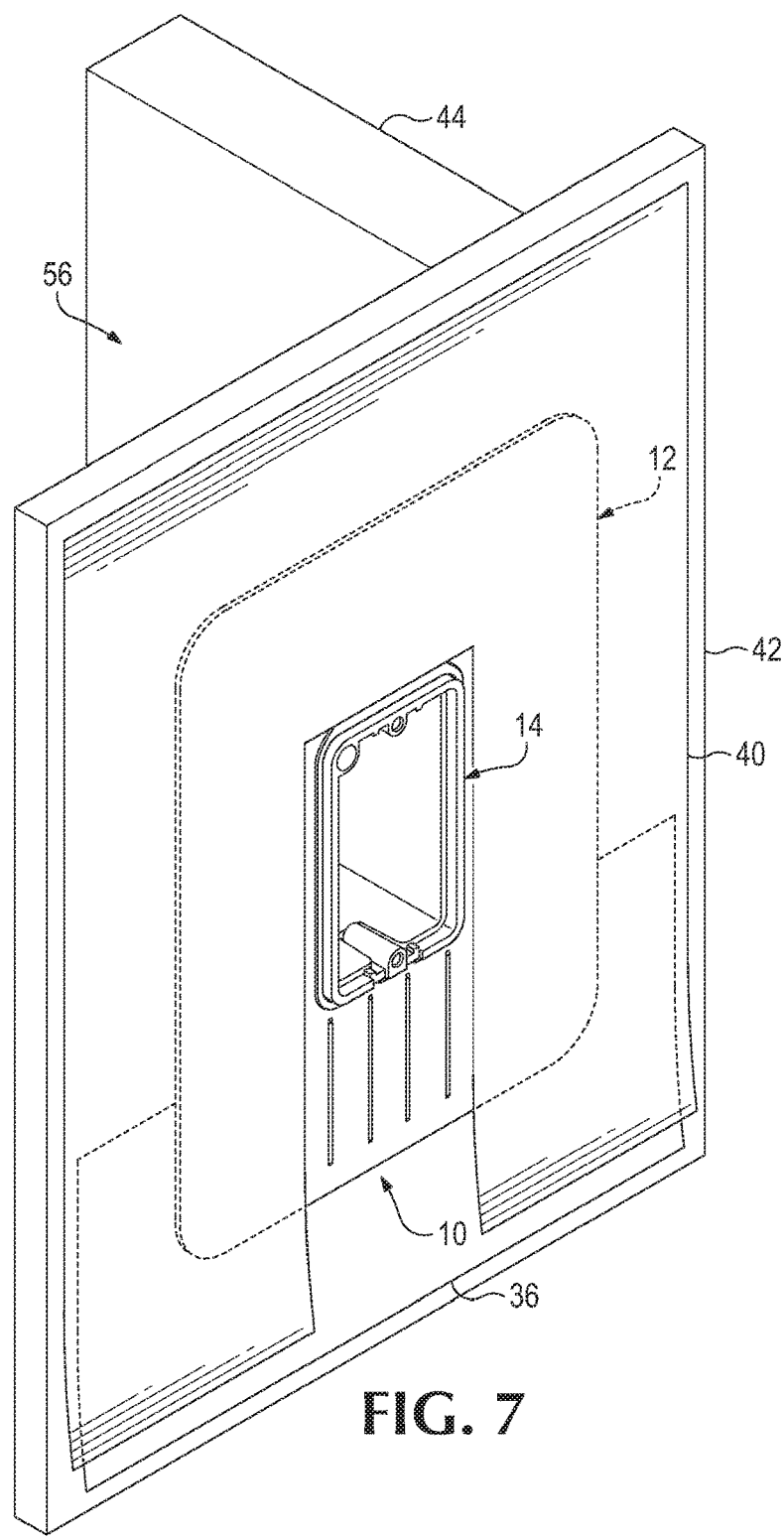
FIG. 7 is an isometric view of the electrical receptacle mounting assembly of FIG. 1, during a step in the installation of the assembly into a wall frame, with a secondary weather barrier, and with obscured portions of the assembly and a portion of a lower sheet of weather barrier shown in dashed line.

Referring to FIGS. 5 and 6, to use electrical receptacle mounting assembly 10, a sheet 36 ("bib sheet"), of the material used for the secondary weather barrier is installed in a location directly beneath a desired location for an electrical receptacle, and a through-hole 38 is created through an underlying piece of sheathing 42, to accommodate enclosure 22. Enclosure 22 is fitted through through-hole 38 and unit 12 is nailed or screwed to a framing longitudinal support 44 at dimples 34, so that the lower portion of panel 28 extends over bib sheet 36. Then (FIG. 7), an additional sheet 40 of the secondary weather barrier is added, so that it overlaps the top part of the front of panel 28 and of sheet 36. As shown, a hole or a notch is cut out to accommodate an eventual protrusion of telescoping extension 14.

Secondary weather barrier elements 40 and 36 are water resistant, typically made of polymer sheeting such as Tyvek®, comprising high-density polyethylene fibers. Alternatively, polypropylene sheeting or asphalt saturated building paper is used.

At this point, or earlier, prior to wallboard being attached to the interior side of support 44 a pair of wires 50 (FIG. 3)

are pulled through holes 27 (FIG. 3), and (referring to FIG. 8) an electrical receptacle 60, typically an outlet, is installed into cavity 24, connected to wires 50, and retained with mechanical screws, installed in a pair of threaded holes 52. Finally, the primary weather barrier 54 is installed and bolt 16 is rotated to bring extension 14 to the level of the outside surface of barrier 54.

The unit 10 is now installed, together with unit 60, and the wall cavity 56 is entirely protected from water ingress.

Figure 8:
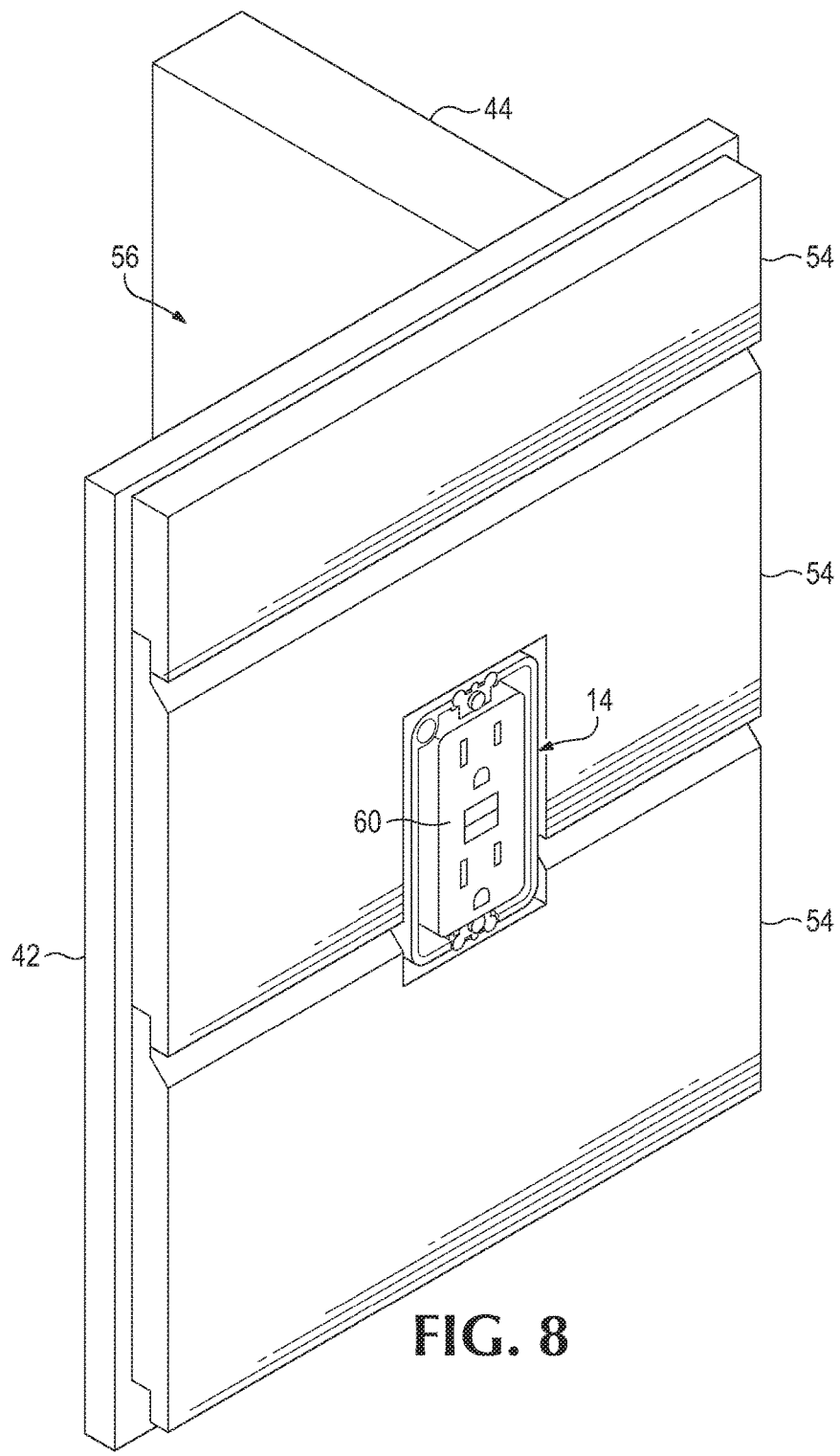
FIG. 8 is an isometric view of the electrical receptacle mounting assembly of FIG. 1, installed into a finished wall and hosting an electrical receptacle.

Referring to FIG. 8, an exterior wall having an outer surface has now been created, that includes a frame, made of longitudinal structural elements 44, joined together and a secondary weather barrier made of sheets 40 and 36. Sheets 40 and 36 and others are not shown, but are mounted on the sheathing 42 which are themselves supported by the frame 44. A primary weather barrier 54, also known as cladding, is outward of the secondary weather barrier, and has an outer surface that is also the outer surface of the exterior wall. Electrical receptacle mounting assembly 10 includes a base 12. The base has two portions: enclosure 22 and panel 28. Enclosure 22 defines a cavity 24 having a mouth, a through-hole 27, opposed to the mouth, leading to the cavity 24. Panel 28 extends outwardly from the mouth, in the space 62 between underlying sheathing 42 and primary weather barrier 54, parallel to the secondary weather barrier 40. The panel is joined to at least one of the longitudinal structural elements 44 and is joined to the secondary weather barrier 40, so that base unit 12 forms an additional secondary weather barrier. Electrical mounting unit assembly 10 further includes telescoping extension 14 having a front surface, and wherein extension 14 is an extension set in place so that the front surface is flush with the outer surface of the primary weather barrier 54. Electrical unit 60 is set into the base unit cavity 24 and insulated electrical wires 50 pass through through-holes 27 of enclosure 22. Thus, electrical unit 60 is electrically connected and may now be powered.

Figure 9:
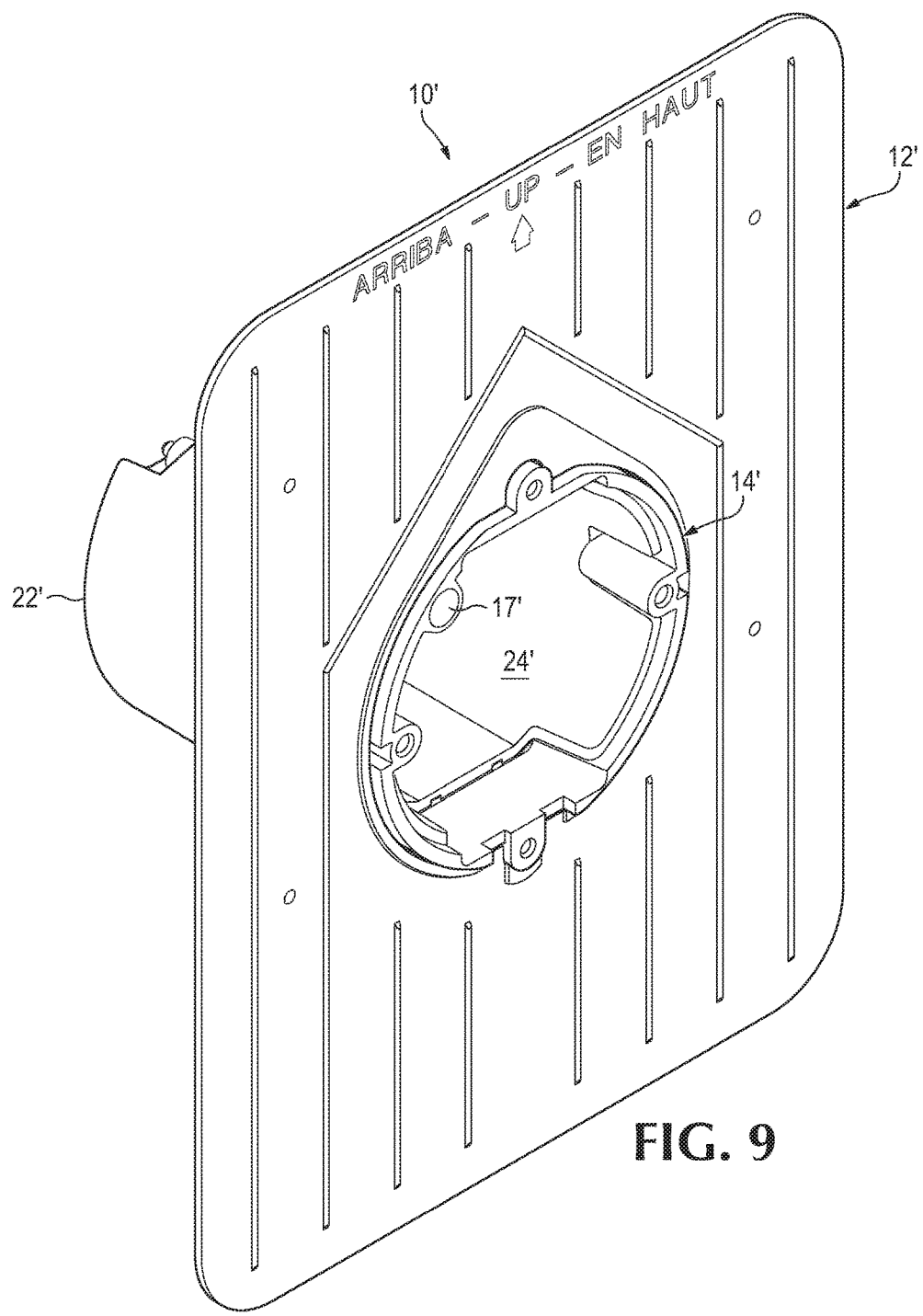
FIG. 9 is an isometric top-front view of the front of an embodiment of an electrical light fixture mounting assembly, according to the present invention.
Figure 10:
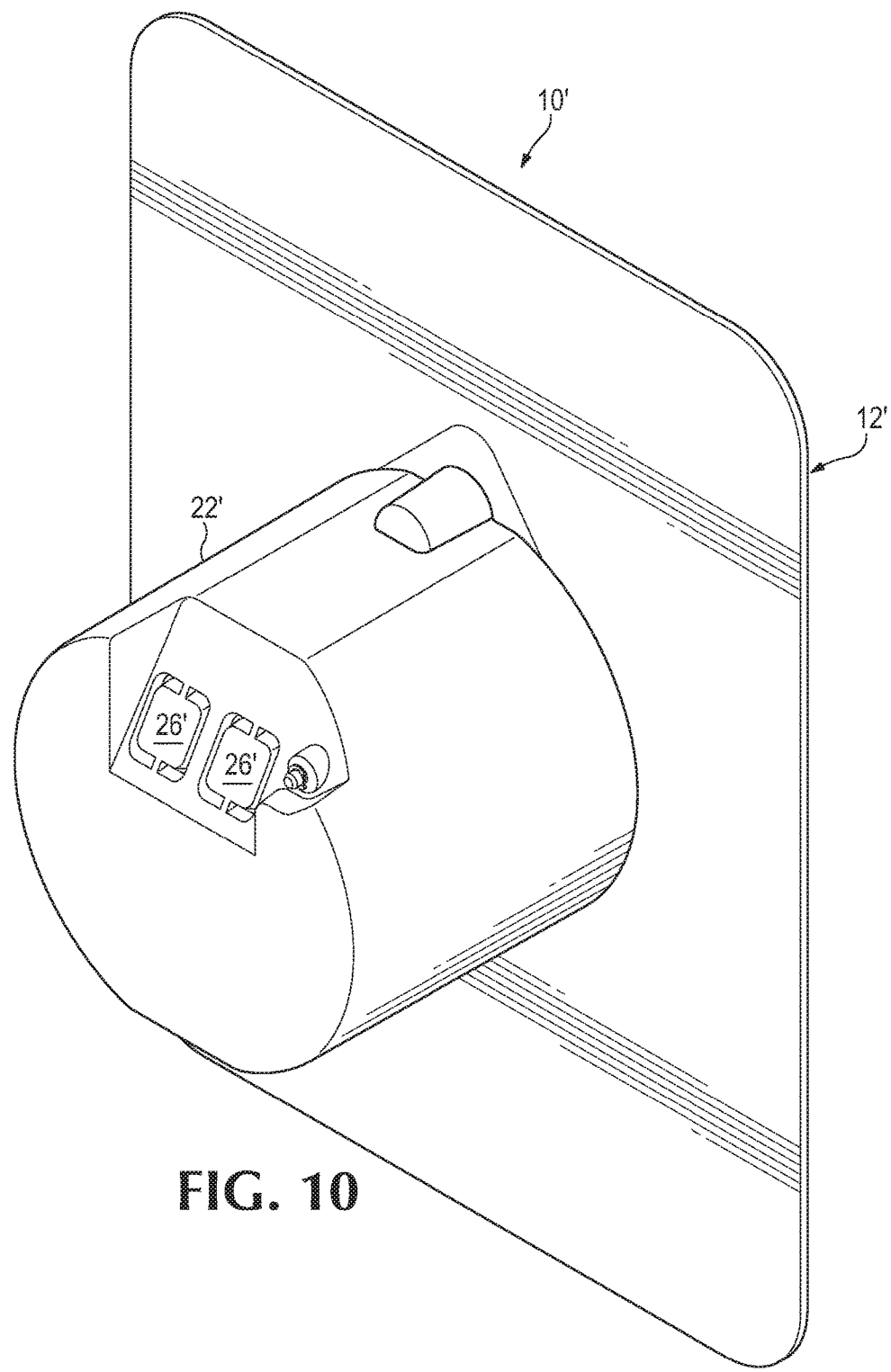
FIG. 10 is an isometric top-rear view of the face of the electrical light fixture mounting assembly of FIG. 9.

FIGS. 9 and 10 show an embodiment of an electrical light fixture mounting assembly 10', having a base unit 12' and an enclosure 22' hosting a telescoping tubular extension 14'. As noted in the definition section, an "electrical unit" may be either a receptacle or a fixture. Assembly 10' is of a general form most typically used for the junction of a light fixture with a source of electricity. Although assembly 10 is most typically used for mounting an electrical fixture, it is not limited to this role, but could be used to mount some type of a fixture, as well.

A bolt (not shown), similar to bolt 16 of assembly 10 held inside bolt cavity 17' and engaged to base unit 12' in the same manner as bolt 16, permits speedy adjustment of the level of projection of extension 14' from assembly 10'. Tubular extension 14' and enclosure 22' are shaped in more of a piecewise oval manner, to accommodate a matching electrical receptacle or light fixture (not shown).

Through-holes 27, created after the removal of punch-outs 26, prevent water flow out of enclosure cavity 24 into wall cavity 56, where it could potentially do a great deal of harm. In an alternative preferred embodiment, additional through-holes are provided, beneath through-holes 27, but also having a downward angle (if viewed from the outside of cavity 24 to the inside), similar to the disposition of through-holes 27. Assembly 10 may be generally formed of a polymeric material, such as polyvinyl chloride, polyamide or a similar material, and telescoping extension 14 may be injection molded. Because assembly 10 is not vertically symmetric, as it is designed to prevent water from flowing out the back of enclosure 22 into a wall cavity, it is important that it bear indicia 58, indicating the "up" side, as shown.

In alternative embodiments, instead of ribs 30, other forms of raised areas are used to define down channels 32, for example a sequence of raised dots or oval shapes. In another embodiment, down channels 32 are not linear, as shown, but are wavy or split apart and joined together. Any method of preventing the interior surface (not shown) of the cladding 54 from blocking the downflow of water by resting against a portion of the surface of panel 28 falls within the scope of one separate aspect of the invention.

Also, in an alternative embodiment, telescoping extension 14 is omitted, and may be replaced with an extension of enclosure 22, extending forward of panel 28. In a preferred embodiment a set of mounting assemblies, similar to mounting assembly 10, but without telescoping extension 14 are provided, with extensions of enclosure 22, projecting forward by differing lengths from panel 28. An installer chooses the assembly having an extension that comes closest to matching the prospective location of the outside surface of the primary weather barrier.

The method, device and constructed wall, according to embodiments of the present invention represent an important paradigm shift over existing methods, which used the primary weather barrier or a combination of the primary and secondary weather barriers to prevent water entry into the wall cavity.

In the above-described embodiments, the stand taken against water ingress is unequivocally positioned at the secondary weather barrier, thereby permitting a greater freedom of implantation at the primary weather barrier. Moreover, the water seal is not dependent on elements that show wear over time, such as caulking or tape, but rather depend on solid elements that have wear lives on the order of several decades. Given the over one-hundred million houses in the United States, an apparatus and method saving them from the damage caused by water ingress into the wall cavities, can be expected to save building owners many billions of dollars per year.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A method of providing an electrical unit, on the exterior of a structure having a frame, supporting a secondary weather barrier, and a primary weather barrier having an exterior surface and wherein a prospective location of said exterior surface is unknown prior to construction of said primary weather barrier, the method comprising:
   providing an electrical unit mounting apparatus, having:
      a base portion, including a partial enclosure defining a cavity having a mouth, one or more through-holes, opposed to said mouth, leading to said cavity and a panel, extending outwardly about said mouth;
      wherein said partial enclosure includes an inner frame, and a set of outer walls;
      a telescoping tubular extension fitted into said cavity, between said inner frame and said outer walls;
      a single adjustment bolt, having a longitudinal segment that is rotatably engaged to a first one of said base portion and said extension, and having a threaded portion being in threaded engagement to a second one of said base portion and said extension, so that rotation of said adjustment bolt causes said extension to move in telescoping manner relative to said cavity;

after said frame has been built, but before said primary weather barrier has been installed, attaching said panel, and thereby said mounting apparatus, to said frame;

forming said secondary weather barrier on said frame;

passing an insulated wire through said through-hole defined by said base portion, and electrically connecting said insulated wire to said electrical unit so as to supply electricity to said electrical unit, then attaching an electrical unit into said cavity; and building said primary weather barrier having an exterior surface, and leaving a through-hole in it, to accommodate said extension; and rotating said adjustment bolt to move said extension to a level coincident to said exterior surface of said primary weather barrier.

2. The method of claim 1, wherein said electrical unit is an electrical receptacle.

3. The method of claim 1, wherein said electrical unit is an electrical lighting fixture.

4. The method of claim 1, wherein said bolt has a head and extends to a tip that is rotatably attached to said base portion, and said threaded portion is between said head and said tip, and is in threaded engagement to a threaded through-hole defined in said extension.

5. The method of claim 1, wherein said bolt has a head and extends to a tip, and wherein said threaded portion that is in threaded engagement to a threaded hole defined in said extension portion, and including a nonthreaded portion, between said head and said threaded portion, that is rotatably engaged to a through-hole in said base.

6. The method of claim 1, wherein said secondary weather barrier is formed of sheets of liquid impermeable material, and in said forming of said secondary weather barrier a first sheet of liquid impermeable material is placed so that it extends from above, over a top portion of said panel, and a second sheet of liquid impermeable material is placed so that a bottom portion of said panel extends over a top portion of said second sheet of liquid impermeable material.

7. The method of claim 1, wherein every one of said through-holes of said partial enclosure is positioned and shaped to prevent water flowing through said through-hole, out of said cavity.

8. The method of claim 1 wherein said tubular extension defines a tube that houses said adjustment bolt, and wherein said adjustment bolt is recessed in said tube, to protect said adjustment bolt.

9. A method of providing an electrical unit, on the exterior of a structure having a frame, supporting a secondary weather barrier, and a primary weather barrier having an exterior surface and wherein a prospective location of said exterior surface is unknown prior to construction of said primary weather barrier, the method comprising:

providing an electrical unit mounting apparatus, consisting of:

a base portion, including a partial enclosure defining a cavity having a mouth, one or more punch-outs, opposed to said mouth, leading to said cavity, every one of said punch-outs being positioned and shaped to permit the creation of a through-hole that prevents water flowing through said through-hole, out of said cavity; and a panel, extending outwardly about said mouth;

a telescoping tubular extension fitted into said cavity;

a single adjustment bolt, having a longitudinal segment that is rotatably engaged to a first one of said base portion and said extension, and having a threaded portion being in threaded engagement to a second one of said base portion and said extension, so that rotation of said adjustment bolt causes said extension to move in telescoping manner relative to said cavity;

after said frame has been built, but before said primary weather barrier has been installed, punching out at least one of said punchouts, to create one or more through-holes and attaching said panel, and thereby said mounting apparatus, to said frame;

forming said secondary weather barrier on said frame;

passing an insulated wire through said through-hole defined by said base portion, and electrically connecting said insulated wire to said electrical unit so as to supply electricity to said electrical unit, then attaching an electrical unit into said cavity; and building said primary weather barrier having an exterior surface, and leaving a through-hole in it, to accommodate said extension; and rotating said adjustment bolt to move said extension to a level coincident to said exterior surface of said primary weather barrier.

10. The method of claim 9, wherein said secondary weather barrier is formed of sheets of liquid impermeable material, and in said forming of said secondary weather barrier a first sheet of liquid impermeable material is placed so that it extends from above, over a top portion of said panel, and a second sheet of liquid impermeable material is placed so that a bottom portion of said panel extends over a top portion of said second sheet of liquid impermeable material.

11. The method of claim 9, wherein said mounting apparatus is clearly marked to indicate a preferred orientation.

12. The method of claim 9 wherein said tubular extension defines a tube that houses said adjustment bolt, and wherein said adjustment bolt is recessed in said tube, to protect said adjustment bolt.

* * * * *